US005680443A

United States Patent [19]

Kasday et al.

[11] Patent Number: 5,680,443

[45] Date of Patent: Oct. 21, 1997

[54] SMART MESSAGES AND SMART MACROS FOR TELECOMMUNICATIONS RELAY SERVICE (TRS) AND OPERATOR SERVICES FOR DEAF (OSD)

[75] Inventors: Leonard Ralph Kasday, Moorestown; Vinay Kundaje, Succasunna; Stephen John Lomax, Flanders; William Lawrence Millios, Freehold, all of N.J.; David E. Schulz, Wheaton, Ill.

[73] Assignee: AT & T, Middletown, N.J.

[21] Appl. No.: 555,555

[22] Filed: Nov. 8, 1995

[51] Int. Cl.$^6$ .................................................. H04M 1/64
[52] U.S. Cl. .......................... 379/67; 379/52; 340/825.19
[58] Field of Search ................... 379/52, 67, 88, 379/89, 93, 143, 155; 340/825.19

[56] References Cited

U.S. PATENT DOCUMENTS

| | | | |
|---|---|---|---|
| 4,785,420 | 11/1988 | Little | 379/52 |
| 5,121,421 | 6/1992 | Albeim | 379/52 |
| 5,463,665 | 10/1995 | Millios et al. | 379/52 |
| 5,475,733 | 12/1995 | Eisdorfer et al. | 379/52 |

*Primary Examiner*—Fan Tsang
*Attorney, Agent, or Firm*—Thomas A. Restaino

[57] ABSTRACT

A telephone call is received at a relay center for routing to a forward party. A platform at the relay center can detect a call processing event in the relay center during processing of the telephone call. The relay center platform generates a context-dependent message based on the call processing event for review by the communications assistant. The communications assistant reviews and sends the message to a relay party using a message button. The relay center platform can automatically transmit messages to the caller, the forward party, a third party, and the communications assistant based on detected call processing events. The message button condenses responses to commonly occurring processing events discerned during call routing. The platform can automatically enter data determined from call processing into blanks in stored message templates. Such stored message templates can be activated and executed in response to detected call processing events.

18 Claims, 5 Drawing Sheets

```
┌─────────────────────────────────────────────────────────┐
│                  DIRECTORY ASSISTANCE                   │
│  AREA CODE OR PLACE NAME_______________________________ │
│              (PRESS INTL ON FOR INTERNATIONAL DA)       │
└─────────────────────────────────────────────────────────┘
```
↖ 92

FIG. 7

```
┌──────────────────────┐
│ DIRECTORY ASSISTANCE │
│ NUMBER: ___-___-____ │
│         NPA NXX XXXX │
└──────────────────────┘
```
↖ 96

FIG. 8

```
┌──────────────────────┐
│ ENTER TIME AND CHARGES│
│       t/c  $___.__   │
└──────────────────────┘
```
↖ 100

SMART MESSAGES AND SMART MACROS FOR TELECOMMUNICATIONS RELAY SERVICE (TRS) AND OPERATOR SERVICES FOR DEAF (OSD)

FIELD OF THE INVENTION

This invention relates to the processing of communications between sound impaired persons and individuals who are not sound impaired.

BACKGROUND OF THE INVENTION

A telecommunications relay service allows a sound impaired person, such as a hearing or speech impaired individual, to employ a text telephone for engaging in a communication session over a telephone network with a sound unimpaired person who has a voice telephone for use in voice-based communications. Operator services for the deaf (OSD) generally refers to relayed text communication between two sound-impaired individuals. Telecommunications relay service (TRS) and OSD are currently provided by having a communications assistant (CA) dedicated to each relay session.

The CA reads over the voice telephone to the sound unimpaired person text messages that are transmitted to the CA by the sound impaired person using the text telephone. The CA transcribes and transmits to the sound impaired person the text of that which he hears being spoken by the unimpaired person. The CA at a TRS relay center translates signals from the sound-impaired caller using a text telephone to another party using a voice telephone.

The sound impaired person initiates a text telephone call using a text telephone keyboard. The text telephone call arrives at the relay center and is routed to a CA position. A modem at the CA position plays a prompt such as "TRS HERE CA 123 GA". The latter identifies the communication assistant's number such as "123" and gives a signal such as "GA" meaning "go ahead".

The text telephone caller supplies the forward number to call. A typical caller response to the prompt would be "PLEASE CALL 908 555-9999 GA". After the caller types "GA", the CA types the forward number and then manually dials the call in order to translate between text signals and voice signals. The CA deduces what is occurring during processing of the call, such as the dialed call ringing, and types back to the text telephone caller that the call is "RINGING", for example.

A previous TRS relay center arrangement provides the CA with a selection of standard messages which can be chosen for display on a text telephone user display screen based on what is occurring during processing of the call. The CA uses a text telephone keyboard with many function keys: F1, F2, F3, etc., to select a message to be sent to a text telephone user, who is party to the relay. When the CA dials a call on behalf of a text telephone user, the CA can tell the text telephone user what is occurring during processing of the call, such as the call ringing, by depressing the function key for "ringing" (e.g., F3) so that the message RINGING is transmitted to be displayed on the text telephone user's display screen. Unfortunately, there are a finite number of practically possible pre-programmed fixed message function keys according to this previous arrangement.

Many differing circumstances require prompting, querying, and statusing of parties to TRS or OSD relay communication. Increasingly, there are more commonly occurring standard messages than available function keys in the previous arrangement. In addition, CAs can forget to press a function key, press the wrong function key, or improperly determine the operating status of the call. Thus, there is a need for an improved message sending capability for TRS or OSD relay communication.

SUMMARY OF THE INVENTION

According to an illustrative embodiment of the invention, a relay center platform is able to detect operating conditions and call processing events and automatically suggest prompting messages which can be activated by the CA to be sent to a party to the relay. Suggested platform-generated messages are based on the event or condition detected. Depending on the event or condition, the message is either (a) displayed for the CA at the relay center so that the CA can, by pressing a message button, send the message to a party to the relay, or (b) automatically sent to a party to the relay if the last transmission from the party included "GA".

If more than one possible message applies based on a detected condition or call processing event, the relay center platform can present the CA with a menu of options corresponding to various situations, conditions and events. The relay platform supports collection of data for inclusion into stored message templates to automate message transmission and associated system operation.

The relay center platform operates to continuously examine a variety of operating and input parameters based on current and previous call processing. The operating and input parameters can include, for example: data entered by a party to the relay; the calling number; the called number; the call type, i.e., voice or text; and other information derived in the course of routing and processing the call. The operating and input parameters are stored for use in further call processing.

The relay center platform is operable to send a message to one or more relay parties or to perform functions ordinarily accomplished by multiple key strokes of the CA. A large number of relaying functions are compressed into the press of the message button or selection from the menu.

Other features and advantages of the invention will become apparent from the following detailed description, taken in conjunction with the accompanying drawing figures, which illustrate, by way of example, the features of the invention.

DETAILED DESCRIPTION

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. The processors presented in the Figures may be provided by a single shared processor. (Use of the term "processor" should not be construed to refer exclusively to hardware capable of executing software.)

Figure 1:
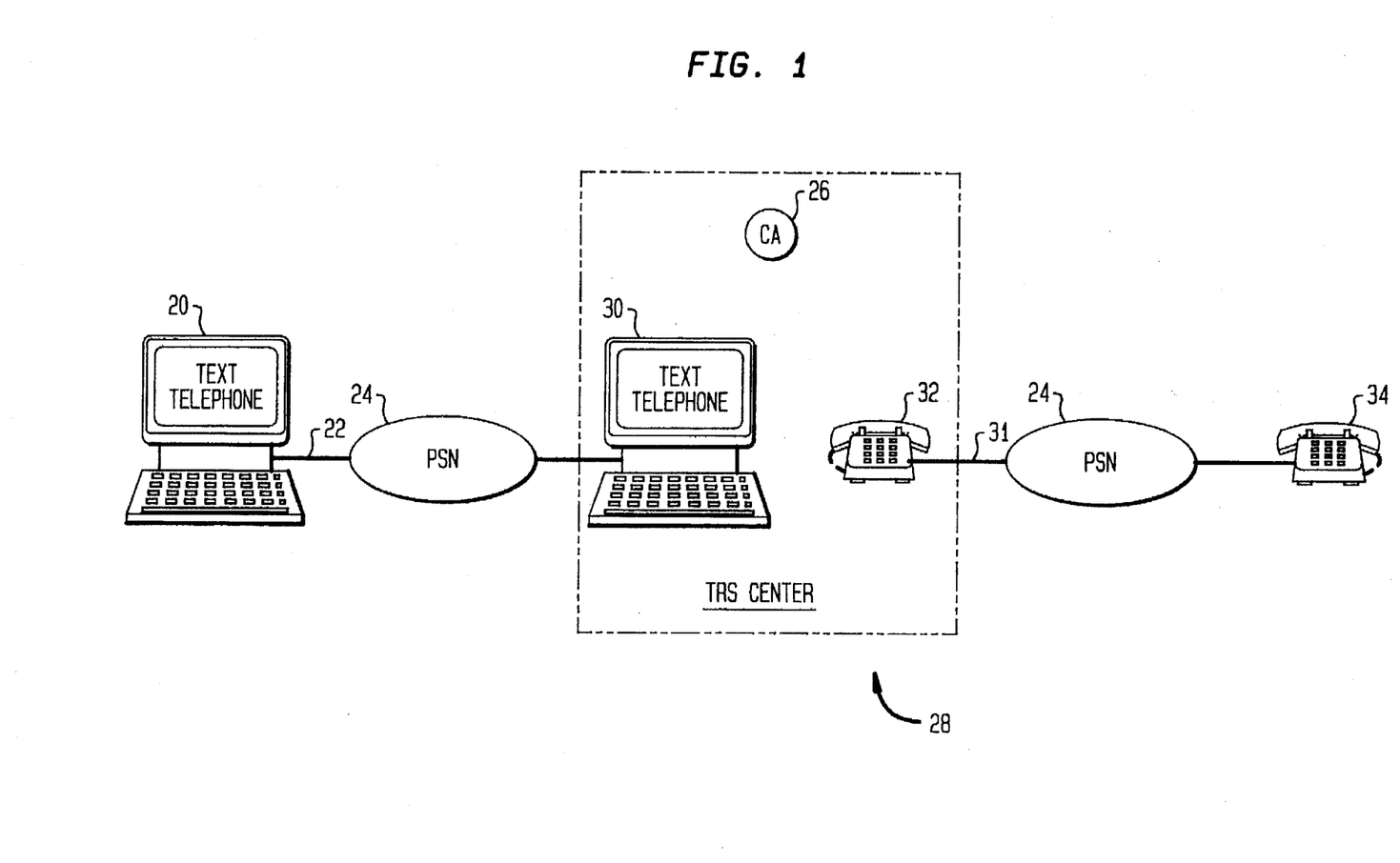
FIG. 1 is a schematic representation for describing relayed text and voice communication.

Referring to FIG. 1, a sound impaired person employs a first text telephone (TT) 20 to establish a text connection 22 over a telephone network (PSN) 24 for a communications relay session with a live communications assistant (CA) 26 at a telecommunications relay service (TRS) center 28. The CA 26 employs a compatible second text telephone 30. The text telephone may be a personal computer, a data terminal, an ASCII-based device, a telecommunications device for the deaf (TDD), a TTY, or other means for generating and receiving text communication.

The CA 26 determines with whom the sound impaired person desires to communicate and establishes a voice connection 31 for the communications relay from a first voice telephone 32 to the desired person at a second voice telephone 34. Communication proceeds by alternating between text communication and voice communication.

In text communication, a text message is input by the sound impaired person to the first text telephone 20. The sound impaired person inputs a predetermined end-of-message code word, such as "GA", which stands for "go ahead", indicating he has completed his message. The text message appears at the second text telephone 30 for the CA who speaks the message into the first voice telephone 32, thereby relaying it, so that the message input by the sound impaired person can be heard by the unimpaired person at the second voice telephone 34.

When the unimpaired person at the second voice telephone 34 hears the code word indicating the end of the message, e.g., "GA" or "go ahead", he begins to speak his own message into the second voice telephone 34. The CA hears, via the first voice telephone 32, that which is spoken by the unimpaired person and transcribes it into the second text telephone 30 for transmission to the first text telephone 20. When the unimpaired person has finished speaking his message, he speaks the end-of-message code word.

When the sound impaired person reads the message, as transcribed by the CA, at the first text telephone 20, he may enter a new message; or, by sending of an appropriate message, such as "SK", the relay session is ended.

Figure 2:
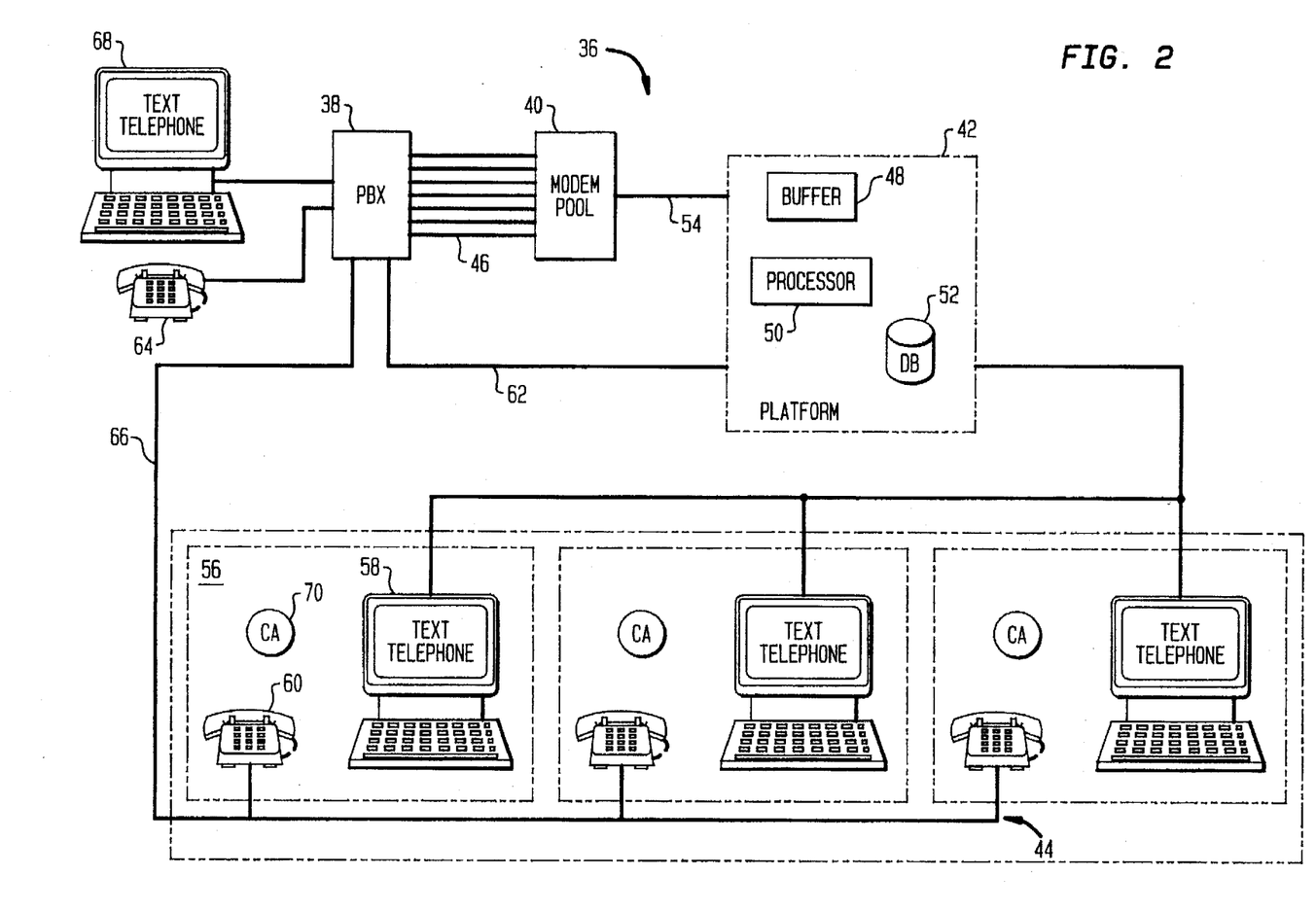
FIG. 2 is a schematic representation for describing a relay center in accordance with an embodiment of the invention.

Referring to FIG. 2, a telecommunications relay service (TRS) relay center 36 comprises a PBX 38, a modem pool 40, a relay center platform 42, and a plurality of CA positions 44. The PBX 38 receives and passes telephone calls along one or more analog lines 46 to the modem pool 40. The relay center platform 42 is coupled to the modem pool 40 and comprises a buffer 48, a processor (PROC.) 50, and a database (DB) 52. Illustrative embodiments of the processor 50 may comprise digital signal processor (DSP) hardware, such as the AT&T DSP16, or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. The processor 50 controls the overall operation of the relay center platform 42.

The buffer 48 may be a digital buffer which is configured to operate in a first in, first out (FIFO) mode. The buffer 48 can be a distinct physical unit or can be a logical unit in a centralized buffer system. The buffer 48 may be implemented using its own dedicated hardware or using hardware shared with other elements of the relay center platform. The buffer 48 can operate in a pass-through mode or in a bypass mode.

The relay center platform 42 receives data from and sends data to the modem pool 40. After processing the data, the relay center platform 42 passes data on a first line 54 to the plurality 44 of CA positions. Each CA position 56 includes a text telephone 58 with a display screen and a keyboard and a voice telephone 60. The relay center platform 42 processes data to and from the PBX 38 through a second line 62.

The relay center platform ("the platform") 42 routes the calls between the one or more analog lines 46, the modems in the modem pool 40, the first line 54, and the plurality 44 of CA positions; and, back from the CA positions to the modem pool 40 and the one or more analog lines 46. The platform 42 operates to send control signals on the second line 62 to control the PBX 38 to route calls in and out of the TRS relay center 36. The PBX 38 connects the voice telephones 60 at the plurality 44 of CA positions directly with outside voice telephones 64 through a second set 66 of analog lines for voice communication with voice telephone users.

A text telephone call arrives at the PBX 38. The platform 42 controls the PBX 38 to route the call to the modem pool 40. The platform 42 then automatically answers the line and plays a prompt such as "TRS 123 here GA". In response, the text telephone caller 68 could type forward number information such as "PLS CALL 908 555 9999 GA". Each character enters the buffer 48 in the platform 42.

The platform 42 is operable to detect preselected call processing events and operating conditions manifested during call processing and routing in the relay center 36. The platform 42 accesses the database 52 which stores a list of standard messages for preselected call processing events (e.g., billing instructions, collect call requests, third-party billing, directory assistance, etc.). The platform 42 operates to generate a message based on an existing preselected condition or call processing event as a suggestion to the CA text telephone 58 display screen, which can be reviewed and transmitted by the CA 70.

Figure 3:
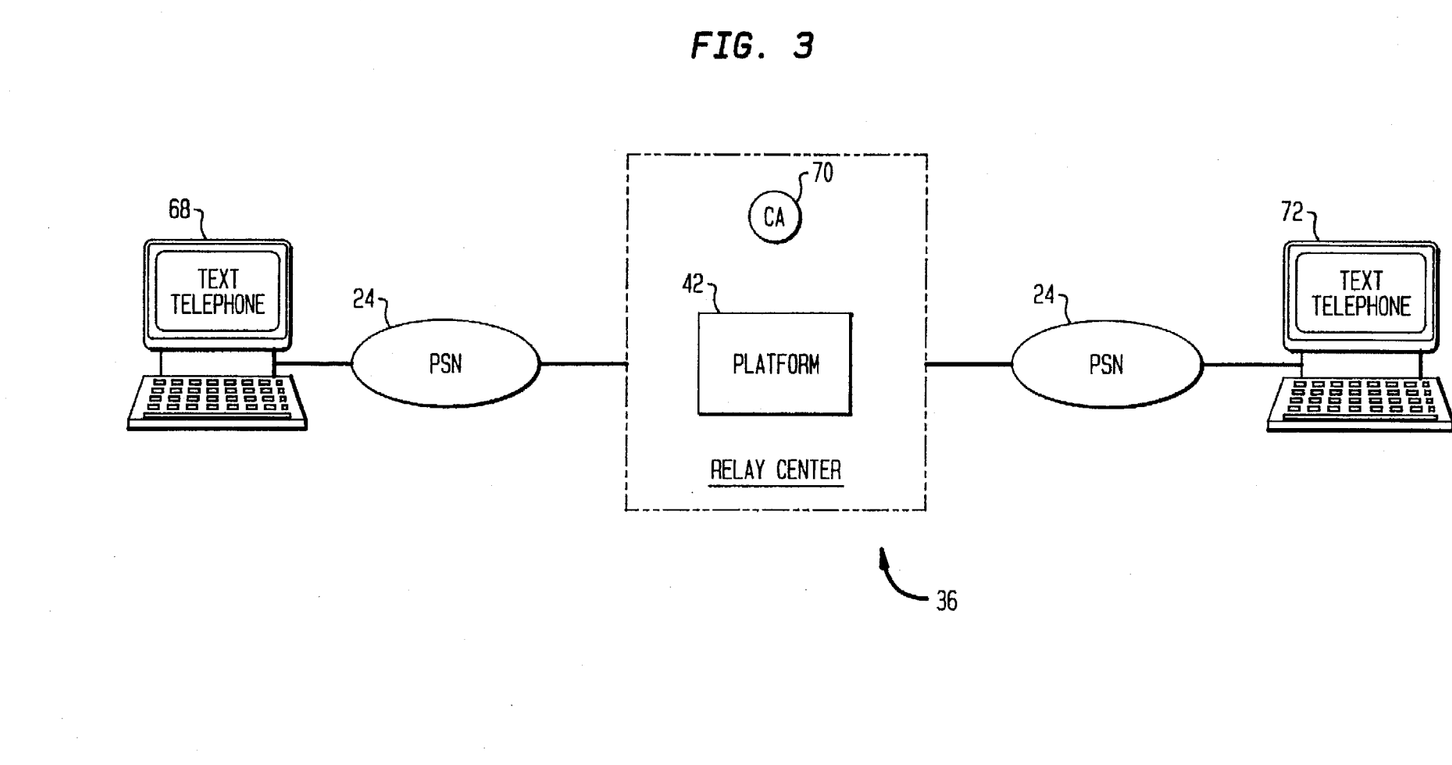
FIG. 3 is a schematic representation for describing the relay center depicted in FIG. 2 operating to detect forward text communication.

An example of a preselected call processing event or condition to be detected is if a forward called party 72 answers the CA 70 in text mode, as shown in FIG. 3. When the forward party 72 answers in text mode, a platform-generated text message for the forward party 72 based on the event or condition is suggested to the CA 70. If the platform 42 has detected a collect calling situation, for example, the message (retrieved from the database 52) to be sent to the forward party 72 can be "WILL YOU PAY FOR A COLLECT CALL FROM". The message is displayed to the CA 70 at the relay center and the CA 70 can press a message button on the text telephone keyboard to send the message to the forward party. In another embodiment, the retrieved message is automatically sent by the platform 42 to the forward party 72 if the last transmission from the forward party included "GA". The relay center platform 42 can be switched between these two modes (semi-automatic and automatic) of operation.

If the platform 42 determines that more than one possible message applies based on a detected condition or call processing event, the platform 42 can present the CA 70 with a menu of options corresponding to various courses of action. The platform 42 operates to continuously examine a variety of operating and input parameters based on processing of the call. The operating and input parameters can include that which a user has typed, the back number, the forward number, the call type, and other information that has been derived by the relay center platform 42 in the course of processing the call.

In a specific embodiment, the TRS platform 42 could present to the CA the suggested message for activation and transmission to the text telephone caller 68: "DO YOU WISH TO BILL THIS CALL TO A THIRD NUMBER OR CALLING CARD". The CA 70 depresses the message button and the message is sent to the text telephone caller 68. The CA 70 reviews the text response from the text telephone caller and determines a billing number if appropriate. The billing number can be subsequently validated automatically. Upon validation, the forward number can be dialed by the CA or automatically dialed by the platform.

The platform 42 allows the TRS relay center 36 to automatically generate prompts and queries to the text telephone caller 68, the forward called party 72, third parties, and the CA 70 based on detected preselected call processing events and operating conditions. Context-sensitive messages are provided to the CA 70, which can be actuated by depressing the message button. This capability condenses common responses to commonly occurring circumstances discerned from call processing and routing. The platform interactively transmits data to and receives data from the CA 70, the back calling party 68, the forward called party 72, and third parties.

The platform 42 is able to detect situations where particular messages are appropriate and alert the CA 70 responsive to the situations. Some messages are appropriate only at certain times in an interaction. For example, if a calling card was denied, a message such as the following is appropriate: "THE CALLING CARD NUMBER WAS REJECTED, PLEASE ENTER ANOTHER NUMBER GA". The single message button for sending platform-generated messages aids a communications assistant, standardizes the messages, and insures that they are delivered.

Figure 4:
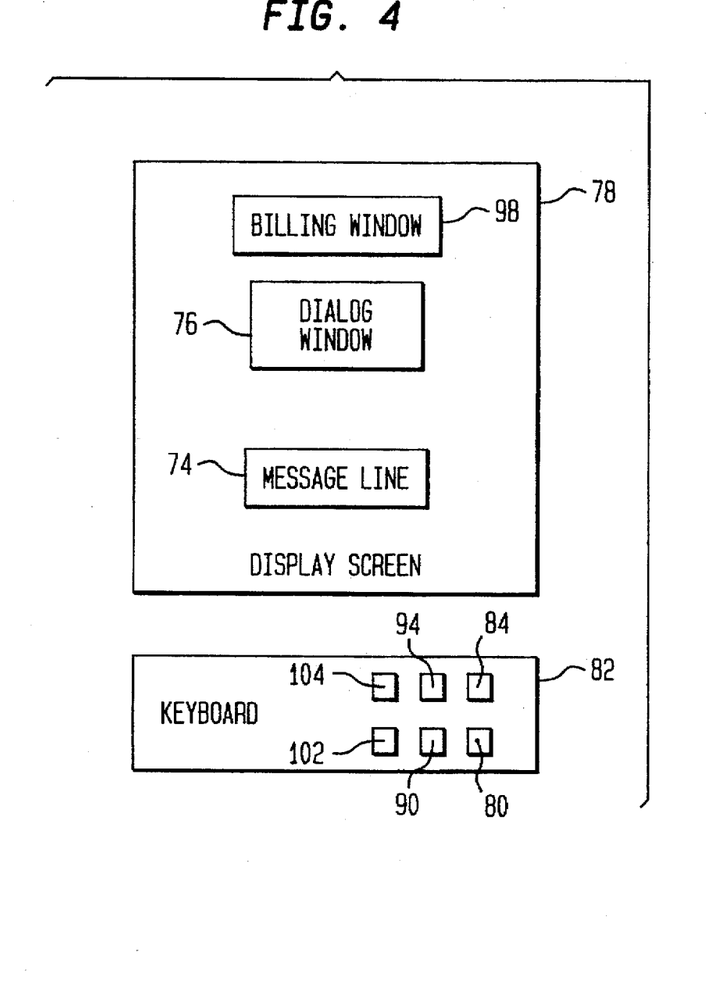
FIG. 4 is a schematic representation for describing a text telephone display screen and keyboard at a CA position in the relay center depicted in FIG. 2.

Referring to FIG. 4, messages are transmitted by the relay center platform 42 to be displayed on a message line 74, positioned below a main dialog window 76 for transmitting and receiving text communications, which overlays the bottom border of a text telephone display screen 78 at a CA position in the TRS or OSD relay center.

When the platform 42 generates a "smart" (context-dependent) message for the CA, the following video communications are displayed at the text telephone display screen 78 at the CA position:

(1) "MESSAGE" displayed, flashing in a special warning color at the beginning of the message line 74,
(2) followed by "1", "2", or "3" in the warning color,
(3) followed by the suggested message in a prompt color on the message line 74,
(4) followed by the prompt "ACTIVATE THE SMART MESSAGE BY PRESSING THE MESSAGE BUTTON".

When a platform-generated message appears on the message line 74 of the CA text telephone display screen 78, pressing the message button 80 on the CA text telephone keyboard 82 sends the suggested message. The numbers "1", "2", or "3" after the phrase "message" indicate the party that will see the platform-generated message. The number "1" indicates a message being seen by the CA, "2" indicates a message to be seen by the calling party, and "3" indicates a message to be seen by the called party. The CA can clear or erase the suggested message by depressing a "clear" button 84, which causes the platform to clear the message line 74.

New suggested platform-generated messages overwrite previous platform-generated messages. For example, if a suggested message A is on the message line 74, and a suggested message B arrives from the relay center platform 42, then suggested message B will replace suggested message A. Pressing the message button 80 will send suggested message B. Suggested messages remain on the message line 74 until they are cleared by the CA acting to press the clear button 84 or are overwritten by a newer one.

Figure 5:
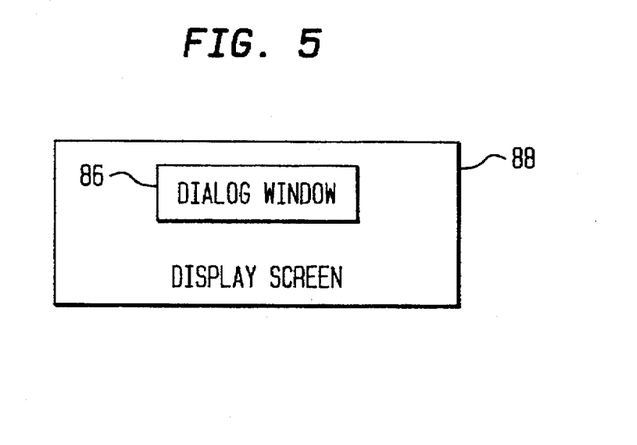
FIG. 5 is a schematic representation for describing a text telephone display screen.

The platform 42 operates to transmit an activated platform-generated message in response to the message button 80 being pressed. Platform-generated messages transmitted to the calling party appear in a dialog window 86 of the calling party's text telephone display screen 88, as shown in FIG. 5. The CA ordinarily follows TDD protocol so as to not send the message until the caller has typed "GA", unless the CA has reason to believe there is a problem.

The following are examples of call routing and processing in accordance with the principles of the invention.

If the text telephone calling party has requested calling card billing but the card has not been accepted, the platform 42 activates the suggested message "SORRY CARD NOT ACCEPTED PLS REPEAT NBR OR GIVE OTHER BILLING GA".

If the platform 42 detects that the text telephone caller is calling from a coin or pay telephone, the platform generates the suggested message "HOW WOULD YOU LIKE TO BILL THIS CALL Q GA".

For example, the platform 42 determines that the billing type is collect and that the equipment type of the forward called party is text 72 (FIG. 3). After the forward party picks up, the platform suggests the message "WE HAVE A COLLECT CALL FROM" to the CA for transmission to the forward party. If and when this message is sent by depressing the message button 80 (FIG. 4), the CA can type the name of the calling party. The platform 42 is able to detect when the CA has started typing and thereupon generate a suggested subsequent message "WILL YOU PAY FOR THIS CALL Q GA".

If the response by the called party to the subsequent message is negative, the platform 42 activates the smart message "SORRY THEY DID NOT ACCEPT THE CALL DO YOU WANT TO PAY FOR THE CALL ANOTHER WAY Q GA" for transmission to the caller. If the response is positive, the platform activates the message "CALL WAS ACCEPTED . . . :" for review and sending by the CA.

For example, if the platform 42 has determined that the caller desires billing to a third party, then after a number for the third party has been dialed and answered in text mode, the platform activates the smart message for transmission by the CA ". . . WOULD LIKE TO CHARGE A CALL TO THIS NUMBER WILL YOU PAY FOR THE CALL Q GA". This enables the CA to first type the name of the text telephone calling party who wants the third party to pay for his call before sending the suggested rest of the message by pressing the message button 80. A text transmission from the third party received by the CA indicates acceptance of charges. The platform operates to generate the smart message "THEY HAVE ACCEPTED THE CHARGES . . . ".

The relay center platform 42 has the ability to detect ringing, a busy signal, and an answer by the forward called party. These detected call processing events and conditions will trigger smart messages in one of two modes: semi-automatic message transmission and fully automatic message transmission. The relay center platform is controllable to be switched between theses two modes.

If the platform 42 is switched into a fully automatic mode, the context-dependent messages are transmitted to the back or forward party automatically, without review by the CA. The automatic messages are initiated as soon as the CA has dialed successfully without reaching an error condition (e.g., an invalid calling card number) unless: the platform has not detected "GA" from the caller; the caller has typed something past that "GA"; or, the CA has typed in the dialog window 76 of his display screen 78 after the "GA".

In fully automatic operation, if the called line rings, the platform operates to send the following message to the caller without review by the CA: "THE LINE IS RINGING". The numbers "1 . . . 2 . . . 3 . . . " are timed to be sent by the platform 42 to the caller once every 6 seconds so as to have the same timing as the ring cycle. When the forward party picks up, the "RINGING" messages stop, and the message "ANSWERED" is automatically sent to the caller.

If the line is busy, the platform 42 automatically sends the message "BUSY, SHALL I TRY AGAIN Q GA" to the caller.

The operating mode of the relay center platform 42 is easily switched between semi-automatic and automatic modes. If the operating mode of the platform is switched from automatic to semi-automatic, the platform generates messages semi-automatically and operates interactively with the CA as previously described; the platform operates to generate suggested status messages to be sent by the CA using the message button 80.

The platform processor 50 (FIG. 2) is able to store "fill-in-the-blank" forms. The forms are able to receive data based on monitored input and operating conditions directly from the platform 42. The platform is operable to enter data into the forms based on operating and input parameters. The platform activates the forms to appear in the display screen dialog window 76 at the CA position for use by the CA. The displayed forms are able to receive (additional) data entered through the CA text telephone keyboard 82. Positioning of windows on the display screen 78 is selectable and changeable.

Figure 6:
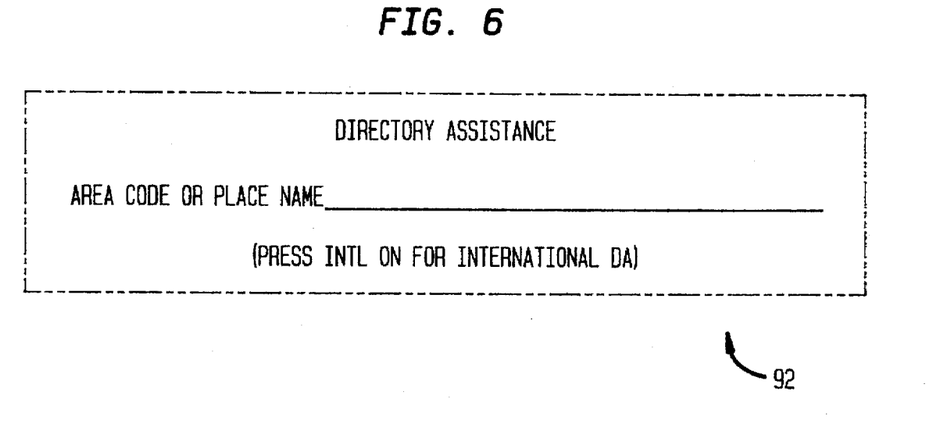
FIGS. 6 and 7 show directory assistance forms displayed in accordance with an embodiment of the invention.

Pressing a directory assistance button 90 on the keyboard 82 (FIG. 4) at the CA position 56 (FIG. 2) brings up an initial directory assistance NPA (area code) form 92 to receive data from the CA for recording and billing purposes, as shown in FIG. 6. In the preferred embodiment, the space in the form contains a 50 character textual field for receiving entered data. Entering a place name in the NPA (area code) field causes the area code to be retrieved and entered into the form by the platform 42 automatically. This capability is currently supported by existing databases in telephone switching networks. The NPA (area code) can also be entered directly in the field of the initial directory assistance NPA form 92 by the CA. The CA enters, changes, or accepts the NPA in the initial directory assistance NPA form 92, and presses a "continue" button 94 (FIG. 4).

If the area code is improper, the platform 42 presents an error message and leaves the cursor at the beginning of the NPA field, so that the CA can correctly enter the NPA. If the CA continues to enter an invalid NPA, this form will remain until the clear button 84 is pressed to clear the screen.

Figure 7:
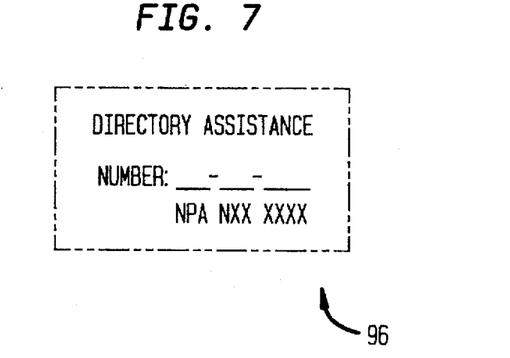

If the NPA is valid, the platform 42 generates the suggested message for review by the CA to be sent to the caller: "PLEASE HOLD . . . ", dials NPA-555-1212 in voice mode on a voice line of the outgoing second set of analog lines 66 (FIG. 2), and replaces the initial directory assistance NPA form 92 (FIG. 6) with a directory assistance number entry form 96 as shown in FIG. 7.

In the directory assistance number entry form 96, an NPA textual field initially contains the NPA from the initial directory assistance NPA form 92, but can be edited by the CA in case the actual NPA is different. The CA can then enter the correct number into this form as the response to the caller's directory assistance query, and can press the continue button 94 (FIG. 4) so as to transmit the response.

A typical ten-digit telephone number is modeled as (NPA) NXX-XXXX. If the exchange (NXX) entered in the directory assistance number entry form 96 (FIG. 7) is not valid, i.e., the first digit of NXX is 0 or 1, the following error message is presented to the CA to be sent to the caller: "INVALID EXCHANGE (NXX) ENTERED". The directory assistance number entry form 96 remains on the CA display screen 78 (FIG. 4), and the cursor moves to the beginning of the NXX field.

If the XXXX portion is not complete, an error message is presented to the CA for review and sending; the directory assistance number entry form 96 stays on the display screen 78; and the cursor moves to the beginning of the NXX field for further data entry by the CA. When the (NPA) NXX-XXXX is entered properly, the platform carries forward and stores the initial directory assistance NPA form information and the directory assistance number entry form information in the processor 50 (FIG. 2). The directory assistance number entry form 96 then disappears.

A portion of the display screen 78 (FIG. 4) of the CA text terminal is devoted to displaying a billing window 98. For billing purposes, a carrier textual field in the billing window is populated with a designation for an interexchange carrier or a local exchange carrier depending on platform location.

The following message is suggested for the CA to send: "THE NBR IS <NPA>-<NXX>-<XXXX> SHALL I DIAL IT FOR YOU FOR Q GA"; <NPA>, <NXX>, and <XXXX> are the retrieved NPA, NXX, and XXXX, respectively, being carried forward to this point. After this message has been sent to the caller, the platform 42 generates the message "THANK YOU FOR USING <carrier>"; in which <carrier> is the carrier designation to which the call will be billed, which is filled in by the platform.

The relay center platform 42 operates to calculate the time and charges to be billed for the directory assistance services. The time and charges textual field of the platform is seven characters long in the preferred embodiment. The platform 42 displays a menu with choices: (n)one; (e)nter value manually; and (a)utomatic, at the CA display screen 78.

Selecting "none" is the default and populates the field with "none".

Figure 8:
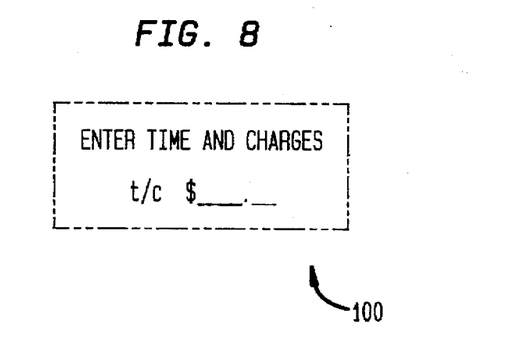
FIG. 8 shows a time and charges entry form displayed in accordance with an embodiment of the invention.

Selecting "enter value manually" generates a displayed time and charges parameter entry form 100 with numerical fields as shown in FIG. 8. Entering a number and pressing the continue button 94 (FIG. 4) causes the time and charges field to be populated with the number.

Selecting "automatic" populates the field with an "auto" command for the platform 42 to activate a context-dependent message template. When the call returns from being relayed by the platform, the message template "YOUR CALL WAS <minutes> MINUTES and cost <amount> GA" is activated, and the platform enters the correct time duration and amount automatically, for review and sending by the CA.

The platform 42 operates automatically after the forward party disconnects to generate the suggested message "WOULD YOU LIKE TO MAKE ANOTHER CALL Q GA", to be sent to the caller. The CA sends the message by pressing the message button 80 or clears the message by pressing the clear button 84.

An operating example depicting call flow according to principles of the invention will now be described. A text telephone caller 68 (FIG. 2) dials a telephone number for a relay center 36. The relay center platform 42 routes the text call to an available CA position 56 and sends a welcome message to the text telephone caller: "HELLO, CA 123 GA". The text telephone caller 68 responds by typing "PLEASE CALL DIRECTORY ASSISTANCE IN LONG VALLEY, NEW JERSEY FOR JOE'S PIZZA GA". The relay center platform 42 routes this text to the CA position 56. A dialog and other windows are displayed in the text telephone display screen 78 (FIG. 4) at the CA position 56. The CA 70 reads the routed text and sees the text string "DIRECTORY ASSISTANCE". The CA presses the directory assistance button 90 on the text telephone keyboard 82 to retrieve the initial directory assistance NPA form 92 (FIG. 6).

The platform 42 responds to the CA depressing the directory assistance button 90 by sending the initial directory assistance NPA fill-in form 92 to the CA display screen 78. The CA 70 enters the area code or city and presses the continue button 94.

The platform responds to the pressed continue button 94 by sending the directory assistance number entry form 96 (FIG. 7) to the CA display screen 78 (FIG. 4). The CA 70 reviews the directory assistance number entry form 96. The platform 42 sets up a forward ball to the directory assistance office and provides a suggested message to the CA, such as "PLEASE HOLD". The CA sees the message displayed on the message line 74 (FIG. 4) and hears the directory assistance call connecting. The CA presses the message button 80 so as to send the message to the text telephone caller 68 (FIG. 2). The text telephone caller 68 sees "PLEASE HOLD". The CA 70 speaks to the directory assistance office using the voice telephone 60 and gives them the name and location of the entity (Joe's Pizza in this example). The directory assistance office worker speaks the queried number into another voice telephone 64 which is heard by the CA at the voice telephone 60. The CA types the number received from the directory assistance office into the directory assistance number entry form 96 and presses the continue button 94.

Responsive to pressing the continue button 94, the platform 42 generates a message containing the telephone number for review by the CA. The CA 70 sees the message on the message line 74 of the display screen 78 for approval. The CA presses the message button 80 to send the message to the text telephone caller 68. The text telephone caller 68 sees in the dialogue window 86 (FIG. 5) the displayed message, which contains the telephone number.

A bill based on the information in the directory assistance forms is generated for the directory assistance call. The platform 42 suggests to the CA 70 a message that asks the text telephone caller 68 if there is another call requiring a relay service; the text telephone caller 68 can respond to this inquiry.

In a variation of the above-described operating example, when the CA 70 types the queried number into the directory assistance number entry form 96 and presses the continue button 94, the platform 42 generates a message containing the retrieved telephone number and also an interrogative message for the text telephone caller "SHALL I DIAL IT NOW Q GA". After reviewing the message, the CA 70 presses the message button 80 to send the message to the text telephone caller 68. The platform 42 generates a directory assistance bill for billing purposes.

The text telephone caller 68 responds to the querying message. The CA 70 reviews the response to determine a "yes" or "no".

If the text telephone caller 68 answers "YES, BILL TO CALLING CARD 9999 9999 9999 9999", the CA sees "YES" and presses a "use-it" button 102. The platform 42 responds to the pressed use-it button 102 to enter the forward number retrieved from the directory assistance office into a billing form displayed in the billing window 98 (FIG. 4). The CA enters the calling card number into the displayed billing form and presses a verify button 104. Responsive to the pressed verify button 104, the platform 42 verifies the calling card number.

In this example, calling card verification is denied. The platform 42 detects this condition, and is responsive to generate a message of card number invalidity for approval by the CA, such as: "THAT NUMBER IS INVALID . . . ". After reviewing the message, the CA 70 presses the message button 80 to send the message to the text telephone caller 68.

The text telephone caller 68 sees the invalidity message displayed on his display screen 88 describing rejection of his calling card number. The text telephone caller may then give a correct or different number for billing.

When the CA presses the message button 80 to transmit the message containing the telephone number and the query "SHALL I DIAL IT NOW Q GA", the text telephone caller 68 can respond with a "NO" answer. The text telephone caller may then provide a different forward number to be dialed or end the call.

Operation of the relay center platform 42 enhances Operator Services for the Deaf (OSD). The following is an operating example of an OSD call flow between two text telephone users in accordance with the principles of the invention.

A text telephone caller dials an OSD relay center. The OSD relay center automatically generates a welcoming message to the text telephone caller and routes the incoming call to a CA position in the relay center. The text telephone caller types in response to the welcoming message, "I WANT TO MAKE A COLLECT CALL TO (908) 555-9999 GA". The CA responds in text: "PLS STATE NAME GA". The text telephone caller responds "JOHN GA". The CA dials (908) 555-9999.

For example, the relay center platform detects that the forward number is busy. The platform operates to activate the message "THE NUMBER IS BUSY SHALL I TRY AGAIN Q GA" for review by the CA. The CA reviews the suggested message and presses the message button to send the message to the text telephone caller.

If the text telephone caller types "YES". The CA reviews the received message in the dialogue window and sees the "YES". The CA dials the number again. In this example, the text telephone forward called party answers: "HELLO GA".

The relay center platform detects the answering by the called text telephone party and activates the following message for the CA to review and send to the calling party: "THE CALL HAS BEEN ANSWERED, PLEASE HOLD WHILE THE COLLECT CALL IS APPROVED". The CA reviews and sends the message by pressing the message button. The relay center platform suggests a message for the forward text party: "YOU HAVE A COLLECT CALL FROM JOHN, DO YOU ACCEPT THE CHARGES Q GA". The CA presses the message button to send the message. The called text telephone party answers: "YES, GA".

At this point the CA completes billing procedures and the platform operates to generate a bill for the OSD connection. The CA connects the back text calling party and the forward text called party, and disengages the relay center from the call.

From the foregoing discussion, it will be appreciated that the platform provides a programmable and configurable intelligence for a relay center system. Stored routines and messages are activated in response to various call processing events and conditions. Changes in the stored routines and messages need not be carried out at each CA position, as in previous approaches. The platform can generate context-dependent messages and execute a variety of processing functions ordinarily performed by multiple key strokes of the CA. Allowing the CA to press the message button or select from the menu as described herein compresses many discrete functions into a press of the message button.

While several particular forms of the invention have been illustrated and described, it will also be apparent that various modifications can be made without departing from the spirit and scope of the invention.

What is claimed is:

1. A method for routing a telephone call in a relay center having a communications assistant, comprising the following steps:
   (A) processing the telephone call in the relay center;
   (B) detecting a first call processing event in the relay center responsive to the telephone call;
   (C) determining a set of one or more messages based on the first call processing event;
   (D) modifying the set of one or more messages based on a subsequent call processing event;
   (E) determining a message from the modified set of one or more messages; and
   (F) sending the message to a relay party.

2. A method according to claim 1, wherein step (B) comprises the steps:
   processing the telephone call in a relay center platform; and
   accessing a database coupled to the relay center platform which stores a list of call processing events.

3. A method according to claim 1, wherein step (B) comprises the steps:
   receiving data entered by a relay party in a buffer; and
   analyzing the data entered by the relay party to detect the call processing event.

4. A method according to claim 1, further comprising the steps:
   storing a message template which can be augmented with call processing data;
   entering call processing data into the message template to generate an augmented message template; and
   generating the augmented message template as the message to the relay party.

5. A method for routing a telephone call in a relay center having a communications assistant, comprising the following steps:
   (A) processing the telephone call in the relay center;
   (B) detecting a call processing event in the relay center responsive to the telephone call;
   (C) determining a message based on the call processing event for actuation by the communications assistant; and
   (D) sending the message to a relay party responsive to actuation by the communications assistant;
   wherein step (C) comprises the steps:
      generating a plurality of messages responsive to the detected call processing event; and
      displaying a menu of options corresponding to the plurality of messages for review by the communications assistant.

6. A method according to claim 5, further comprising the steps:
   receiving the telephone call from a telephone switching network; and
   sending the message in the telephone switching network.

7. A method according to claim 5, wherein step (B) comprises the steps:
   processing the telephone call in a relay center platform; and
   accessing a database coupled to the relay center platform which stores a list of call processing events.

8. A method according to claim 5, wherein step (B) comprises the steps:
   receiving data entered by a relay party in a buffer; and
   analyzing the data entered by the relay party to detect the call processing event.

9. A method according to claim 5, wherein:
   actuation by the communications assistant includes pressing a message button on a text telephone keyboard.

10. A method according to claim 5, wherein:
    the relay party is selected from the group consisting of a calling party, a called party, and a third party.

11. A method according to claim 5, further comprising the steps:
    storing a message template which can be augmented with call processing data;
    entering call processing data into the message template to generate an augmented message template; and
    generating the augmented message template as the message for actuation by the communications assistant.

12. A system for processing a telephone call in a relay center having a communications assistant, comprising:
    means for detecting a call processing event in the relay center responsive to the telephone call;
    means for determining a message based on the call processing event for review by the communications assistant, wherein
    the means for determining is operative to
      (i) generate a plurality of messages responsive to the detected call processing event, and
      (ii) display a menu of options corresponding to the plurality of messages for review by the communications assistant; and
    means for sending the message to a relay party.

13. A system according to claim 12, further comprising:
    means for receiving the telephone call from a calling party; and
    means for relaying the telephone call to a called party.

14. A system according to claim 12, wherein:
    the message is automatically sent to the relay party responsive to a detected call processing event.

15. A system according to claim 12, wherein:
    the means for sending the message to a relay party is responsive to actuation by the communications assistant.

16. A system according to claim 12, further comprising:
    means for storing data derived during processing of the telephone call.

17. A system according to claim 12, wherein the means for sending the message to a relay party comprises:
    a display screen for displaying the message to the communications assistant at the relay center; and
    a message button at the relay center which can be actuated by the communications assistant to send the message to the relay party.

18. A system according to claim 17, wherein:
    the communications assistant can select from a menu of options displayed on the display screen at the relay center using the message button.

* * * * *